US008440920B2

(12) United States Patent
Bulea et al.

(10) Patent No.: US 8,440,920 B2
(45) Date of Patent: May 14, 2013

(54) CIRCULAR SINGLE-LAYER TOUCH SENSORS

(75) Inventors: Mihai M. Bulea, Santa Clara, CA (US); Patrick Worfolk, Campbell, CA (US)

(73) Assignee: Synaptics Incorporated, Santa Clara, CA (US)

(*) Notice: Subject to any disclaimer, the term of this patent is extended or adjusted under 35 U.S.C. 154(b) by 697 days.

(21) Appl. No.: 12/644,969

(22) Filed: Dec. 22, 2009

(65) Prior Publication Data
US 2011/0031041 A1 Feb. 10, 2011

Related U.S. Application Data

(60) Provisional application No. 61/232,342, filed on Aug. 7, 2009.

(51) Int. Cl.
*G06F 3/044* (2006.01)

(52) U.S. Cl.
USPC .................................................... 178/18.06

(58) Field of Classification Search ............ 178/18.06; 345/175, 174, 173, 156; 324/678, 658, 661
See application file for complete search history.

(56) References Cited

U.S. PATENT DOCUMENTS

| 7,372,281 B2 * | 5/2008 | Morimoto ............... 324/661 |
| 7,466,307 B2 | 12/2008 | Trent, Jr. et al. |
| 7,502,016 B2 | 3/2009 | Trent, Jr. et al. |
| 7,705,612 B2 * | 4/2010 | Morimoto ............... 324/661 |
| 7,710,126 B2 * | 5/2010 | Morimoto ............... 324/661 |
| 7,764,274 B2 * | 7/2010 | Westerman et al. ....... 345/173 |
| 8,237,453 B2 * | 8/2012 | Badaye et al. ............ 324/658 |
| 2006/0227117 A1 | 10/2006 | Proctor |
| 2008/0084394 A1 | 4/2008 | Kang |
| 2009/0002338 A1 * | 1/2009 | Kinoshita et al. ......... 345/174 |
| 2009/0251439 A1 * | 10/2009 | Westerman et al. ....... 345/175 |
| 2010/0097077 A1 * | 4/2010 | Philipp et al. ............ 324/678 |
| 2010/0149092 A1 * | 6/2010 | Westerman et al. ....... 345/156 |
| 2010/0149134 A1 * | 6/2010 | Westerman et al. ....... 345/179 |

* cited by examiner

*Primary Examiner* — Fred Tzeng

(57) ABSTRACT

A two-dimensional capacitive sensor device comprises a sensor substrate with a plurality of wedge shaped sensor cells arranged in a single-layer circular pattern proximal to the substrate. The plurality of wedge shaped sensor cells are arranged in a rotationally symmetric pattern about a center of the single-layer circular pattern. A sensor cell of the plurality of wedge shaped sensor cells comprises a first sensor electrode and a second sensor electrode separated by a border. The first and second sensor electrodes are configured for detecting changes in capacitance caused by one or more input objects. The first and second sensor electrodes become substantially thinner in width approaching the center of the single-layer circular pattern than at a distance further from the center. A sensor circuitry is communicatively coupled with the sensor electrodes of the sensor cell and the sensor circuitry is configured to interpret the changes in capacitance.

20 Claims, 20 Drawing Sheets

1500

FORM A FIRST WEDGE SHAPED SENSOR CELL PROXIMAL TO A SENSOR SUBSTRATE, THE FIRST WEDGE SHAPED SENSOR CELL COMPRISING AT LEAST A FIRST SENSOR ELECTRODE AND A SECOND SENSOR ELECTRODE OF DIFFERENT SHAPES SEPARATED BY A SHARED PIECEWISE LINEAR ELECTRODE BORDER, THE FIRST SENSOR ELECTRODE HAVING A DIFFERENT SHAPE THAN THE SECOND SENSOR ELECTRODE.
1510

↓

FORM AN ADDITIONAL N-1 WEDGE SHAPED SENSOR CELLS PROXIMAL TO THE SENSOR SUBSTRATE SUCH THAT THE FIRST WEDGE SHAPED SENSOR CELL AND THE ADDITIONAL N-1 WEDGE SHAPED SENSOR CELLS ARE ARRANGED TO FORM A SINGLE-LAYER CIRCULAR PATTERN, WHEREIN EACH OF THE N-1 WEDGE SHAPED SENSOR CELLS COMPRISES A ROTATION OR REFLECTED ROTATION OF THE FIRST WEDGE SHAPED SENSOR CELL.
1520

1500

FORM A FIRST WEDGE SHAPED SENSOR CELL PROXIMAL TO A SENSOR SUBSTRATE, THE FIRST WEDGE SHAPED SENSOR CELL COMPRISING AT LEAST A FIRST SENSOR ELECTRODE AND A SECOND SENSOR ELECTRODE OF DIFFERENT SHAPES SEPARATED BY A SHARED PIECEWISE LINEAR ELECTRODE BORDER, THE FIRST SENSOR ELECTRODE HAVING A DIFFERENT SHAPE THAN THE SECOND SENSOR ELECTRODE.
1510

FORM AN ADDITIONAL N-1 WEDGE SHAPED SENSOR CELLS PROXIMAL TO THE SENSOR SUBSTRATE SUCH THAT THE FIRST WEDGE SHAPED SENSOR CELL AND THE ADDITIONAL N-1 WEDGE SHAPED SENSOR CELLS ARE ARRANGED TO FORM A SINGLE-LAYER CIRCULAR PATTERN, WHEREIN EACH OF THE N-1 WEDGE SHAPED SENSOR CELLS COMPRISES A ROTATION OR REFLECTED ROTATION OF THE FIRST WEDGE SHAPED SENSOR CELL.
1520

FIG. 15

CIRCULAR SINGLE-LAYER TOUCH SENSORS

CROSS REFERENCE TO RELATED U.S. APPLICATION

This application claims priority to the co-pending provisional patent application Ser. No. 61/232,342, entitled "CIRCULAR SINGLE-LAYER TOUCH SENSORS," with filing date Aug. 7, 2009, and assigned to the assignee of the present invention, which is herein incorporated by reference in its entirety.

BACKGROUND

Capacitive sensor devices, otherwise known as touch sensor devices or proximity sensors are widely used in modern electronic devices. A capacitive sensor device is often used for touch based navigation, selection, or other input, in response to a finger, stylus, or other object being placed on or in proximity to a sensor of the capacitive sensor device. In such a capacity, capacitive sensor devices are often employed in computers (e.g. notebook/laptop computers), media players, multi-media devices, remote controls, personal digital assistants, smart devices, telephones, and the like.

Such capacitive sensor devices are often operated, at least in part, by a sensor circuitry which may include or be embodied in an application specific integrated circuit (ASIC). The inputs and/or outputs of the sensor circuitry are typically used to drive the portions of the sensor/sensor pattern of the sensor device and to measure capacitance(s) from the sensor/sensor pattern.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIG. 15 is a flow diagram of an example method of creating a circular sensor pattern of a two-dimensional capacitive sensor pattern with a plurality of wedge shaped sensor cells, according to an embodiment.

DESCRIPTION OF EMBODIMENTS

Figure 1:
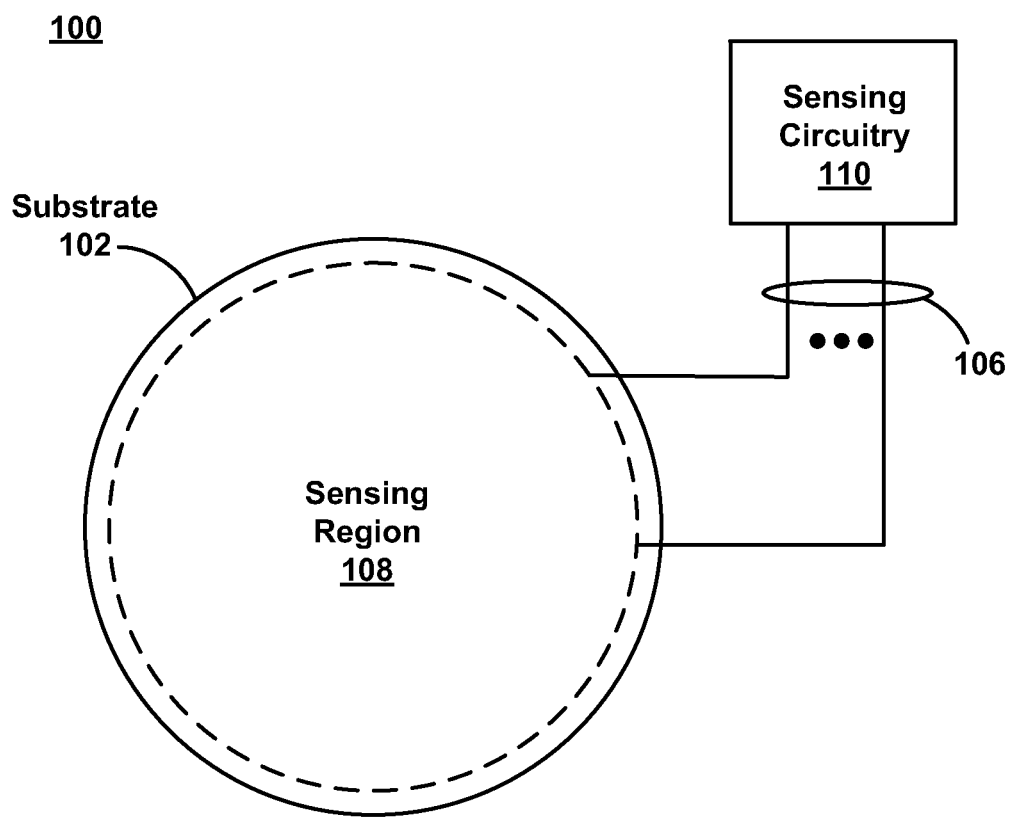
FIG. 1 is an example two-dimensional capacitive sensor device that can be implemented to include one or more embodiments of the invention.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

OVERVIEW OF DISCUSSION

Capacitive sensor types include single-layer and multi-layer capacitive sensors. Due to simplified construction, a single-layer capacitive sensor is relatively cheap when compared to any multi-layer capacitive sensor. However, common-mode noise and finger coupled noise are often problematic in single-layer capacitive sensing. For example, the presence of a liquid crystal display in close proximity to a single-layer capacitive sensor can provide noise which can interfere with the accuracy of sensing measurements made using the single-layer capacitive sensor.

In competitive environments, low cost of manufacture can be a competitive advantage. However, the accuracy of a single layer sensor is highly dependent on the sensor geometry and the noise in the measurements that are coupled into the sensor. Bi-electrode and tri-electrode capacitive sensor cells are two types of sensor cells, described herein, that can be used in circular single-layer capacitive sensor design.

Techniques are described herein for determination of electrode shapes for the electrodes inside of sensor cells of circular single-layer capacitive sensors. The techniques described herein reduce or substantially eliminate common-mode and finger-coupled noise when performing capacitive sensing with the described circular single-layer capacitive patterns and their equivalents. In accordance with these techniques, numerous example implementations of sensor electrodes, sensor cells, and circular single-layer capacitive sensor patterns are described herein. With respect to the described sensor cells, is appreciated that a plurality of copies (rotated or reflected) of a particular sensor cell is typically utilized to form a circular single-layer capacitive sensor. One technique described herein yields sensor cells that include electrodes with some curved borders that are in addition to the curved borders that lie on the circular outer edge of a circular single-layer sensor. While another technique described herein yields sensor cells with electrodes that have straight edges and polygonal shapes except along the curved borders that lie on the circular outer edge of a circular single-layer sensor. It is appreciated that in some embodiments, curved borders internal to electrodes of a sensor cell can be piece-wise approximated with straight edges in the form of polygonal shaped electrodes that approximate the characteristics of the curved electrodes. In these single layer implementations, the sensor electrodes disposed in the single layer are used to detect changes in capacitance caused by input objects (e.g., finger, thumb, stylus) relative to the sensor electrodes. Only those sensor cells and sensor electrodes in the single-layer are required for such capacitive sensing.

Example Capacitive Sensor Device

FIG. 1 is a plan view of an example two-dimensional capacitive sensor device 100 that can be implemented to include one or more embodiments of the present invention. The capacitive sensor device 100 can be utilized to communicate user input (e.g., using a user's finger or a probe) to a computing device or other electronic device. For example, capacitive sensor device 100 can be implemented as a capacitive touch screen device that can, in some embodiments, be placed over an underlying image or an information display device (not shown). In this manner, a user would view the underlying image or information display by looking through the substantially transparent sensing region 108 of capacitive sensor device 100 as shown. It is noted that one or more embodiments in accordance with the present invention can be incorporated with a capacitive touch screen device similar to capacitive sensor device 100.

The capacitive sensor device 100, when implemented as a touch screen, can include a substantially transparent substrate 102 having a set of conductive coupling traces 106 patterned (or formed) thereon. Conductive coupling traces 106 can be utilized for coupling any sensor elements of sensor patterns (not shown) or conductive traces that would form a sensing region 108 with sensing circuitry 110 thereby enabling the operation of capacitive sensor device 100. Conductive coupling traces 106 include a plurality of conductive coupling elements or traces which can be disposed in one or more layers even though a sensor in sensing region 108 is disposed in a single layer. It is noted that embodiments of single-layer sensor electrode patterns (sensor patterns), in accordance with the invention, are described herein in FIGS. 2-14 which can be implemented to form sensing region 108 as a circular single-layer capacitive sensor. It is also noted that all connections between conductive traces 106 and the sensor electrodes of the sensor cells of the described embodiments can be made around the circumferential edges of the various circular single-layer capacitive sensors.

Within FIG. 1, the capacitive sensor device 100 can also be implemented as a capacitive touchpad device. For example, substrate 102 of capacitive sensor device 100 can be implemented with, but is not limited to, one or more opaque materials that are utilized as a substrate for a capacitive touchpad device.

Figure 2:
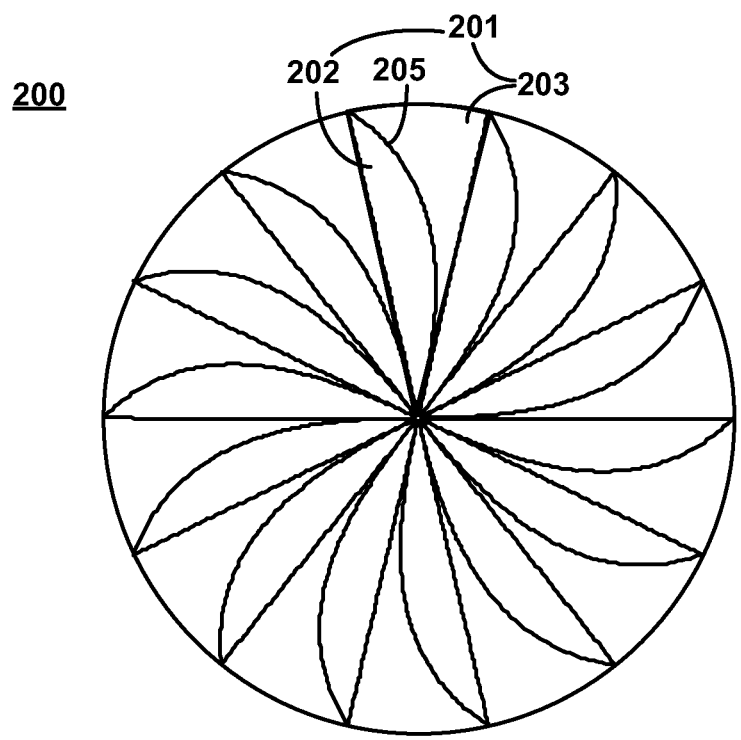
FIG. 2 shows a plan view of an example circular single-layer capacitive sensor cell pattern, according to an embodiment.

Example Single-Layer Capacitive Sensor Cells for Circular Sensor Patterns with Some Curved Internal Electrode Borders in the Sensor Cells FIG. 2 shows a plan view of an example circular single-layer capacitive sensor cell pattern 200, according to an embodiment. Pattern 200 is divided into N sensor cells 201 (only one is labeled) which can also be referred to as wedges. Each sensor cell 201 is split into two electrodes 202, 203 that share a curved border 205. Assuming a unit circle for sensor pattern 200, each sensor cell 201 has an angle of $2\pi/N$ and an area of $\pi/N$. Circular single-layer capacitive sensor cell pattern 200 is referred to herein as a pinwheel sensor pattern. Geometry of sensor cell 201 is illustrated and labeled in FIG. 4, and is described herein.

Figure 3:
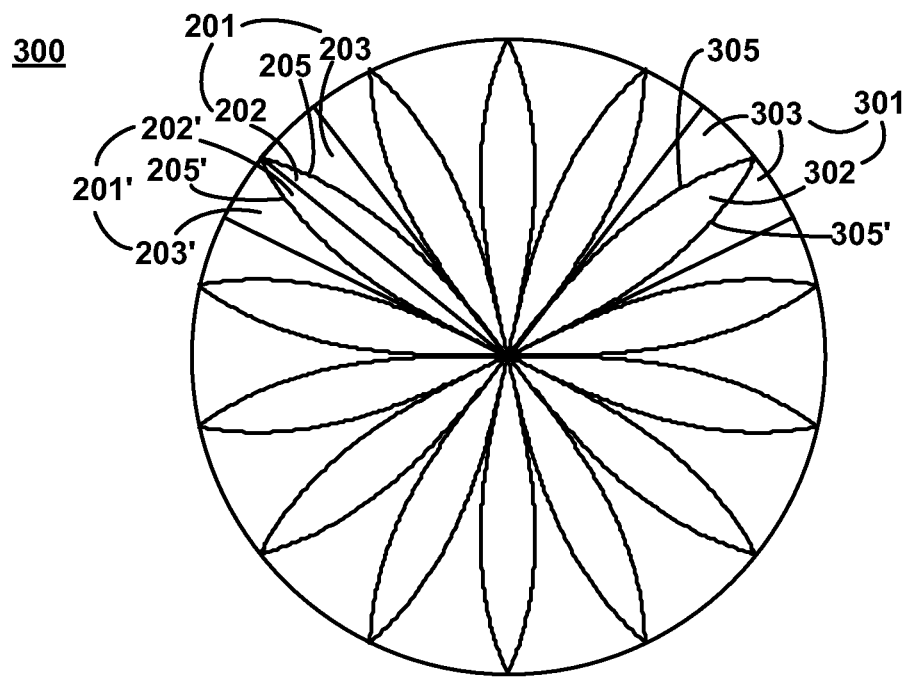
FIG. 3 shows a plan view of an example circular single-layer capacitive sensor cell pattern, according to an embodiment.

FIG. 3 shows a plan view of an example circular single-layer capacitive sensor cell pattern 300, according to an embodiment. According to a first embodiment, sensor pattern 300 is divided into M sensor cells 201 (only one is labeled) which can also be referred to as wedges. Each sensor cell 201 is split into two electrodes 202, 203 that share a curved border 205. Each sensor cell 201' is split into two electrodes 202', 203' that share a curved border 205'. Assuming a unit circle for sensor pattern 200, each sensor cell 201, 201' has an angle of $2\pi/M$ and an area of $\pi/M$. Circular single-layer capacitive sensor cell pattern 300 is referred to herein as a daisy sensor pattern. As can be seen sensor pattern 300 is comprised of an arrangement of sensor cells 201, 201' which are either rotations or reflections and rotations of sensor cell 201 of FIG. 4. One sensor cell 201 is labeled and one reflected sensor cell 201' is labeled. According to a second embodiment, sensor pattern 300 is divided into K rotations of sensor cell 301 (one illustrated) that are composed of sensor electrodes 302 and 303, where a curved border 305 defines and separates electrode 302 from symmetric halves of electrode 303. As will be described further herein, in this second embodiment, electrode 303 is based on a transformation of electrode 203 and electrode 303 is based on a transformation of electrode 202.

Figure 4:
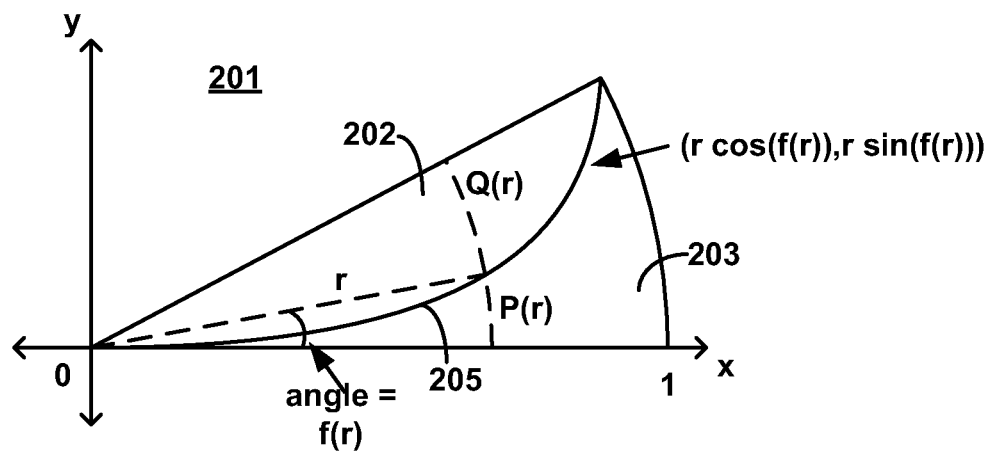
FIG. 4 illustrates the coordinate system and nomenclature for a single sensor cell, according to an embodiment.

FIG. 4 illustrates the coordinate system and nomenclature for a single sensor cell 201. Other sensor cells illustrated in FIG. 2 or FIG. 3 are rotations or reflections of sensor cell 201 of FIG. 3. The curve defining electrode boundary 205 is parameterized in polar coordinates $(r, \theta)$ by $(r, f(r))$. In FIG. 4, and in the following equations, electrode 202 is represented by Q and electrode 203 is represented by P. If $P(r)$ and $Q(r)$ represent the lengths of the circular arcs in the first and second electrodes as a function of the distance from the center, then $$P(r) = rf(r);$$ Equation 1 and $$Q(r) = \frac{2\pi}{N}r - P(r)$$ Equation 2

The area of the electrode P is given by:

$$J(f) = \int_0^1 P(r)dr = \int_0^1 rf(r)dr \quad \text{Equation 3}$$

The equal electrode area constraint that gives common mode noise immunity is given by $J(f)=\pi/(2N)$. The unique quadratic function f(r) that satisfies the equal area constraint and the boundary conditions $f(0)=0$ and $f(1)=2\pi/N$ is given by:

$$f(r) = \frac{2\pi}{N} r^2 \quad \text{Equation 4}$$

Touch position determination has two components: radial and angular. The angular component is determined through interpolation on the total capacitance measured for each wedge. The radial component is determined from examining the measured capacitances (p, q) from two adjacent electrodes identified by the computed angle as being best centered under the finger or other contacting object, such as a stylus. In one embodiment, the common mode noise can be estimated by averaging the few smallest measured capacitances and then eliminated from the measurements of interest. Based upon this estimation, that the resulting p and q are proportional to the arc lengths P(r) and Q(r) under the finger. Thus, $$p = \alpha P(r); \quad \text{Equation 5}$$

and $$q = \alpha Q(r) \quad \text{Equation 6}$$

It then follows that:

$$\frac{p}{p+q} = \frac{P}{P+Q} = \frac{f(r)}{2\pi/N} \quad \text{Equation 7}$$

It also follows that the inversion can be represented as:

$$r = \sqrt{\frac{p}{p+q}} \quad \text{Equation 8}$$

The Babylonian method is one simple algorithm to approximate the square root. The relationship between p and q, and the radius, as expressed in Equations 5 and 6 may be proportional to a function of P(r) and Q(r). As such, the various equations and calculation presented herein would be calculated using different, more complicated methods.

Next addressed is the performance of this design relative to other sector based designs. All sector based designs share a common weakness: as the finger or other contacting object moves closer to the center of the sensor pattern, then the area of the sector covered grows smaller. This means that small measurement errors result in large radial position estimate errors. The metric for this can be defined as:

$$I = \int_0^1 \left[ \left( \frac{d}{dr}\left(\frac{P}{P+Q}\right)\right)^2 + \left(\frac{d}{dr}\left(\frac{Q}{P+Q}\right)\right)^2 \right] dr \quad \text{Equation 9}$$

The intuition behind this metric is the desire for the ratios P/(P+Q) and Q/(P+Q), whose sum is constant, to vary as smoothly as possible as across the radius of the sensor pattern. A calculus of variations computation to determine f(r), where the relation between P(r) and Q(r) is as given earlier, with the same boundary conditions and area constraints gives:

$$f(r) = \frac{5\pi}{4N} r^3 + \frac{3\pi}{4N} r \quad \text{Equation 10}$$

The curve generated by Equation 10 gives an optimum sensor design based on the given metric. However, the finger position formula requires solving a cubic. This is feasible; however, it motivates examination of the differences between the earlier quadratic solution and this cubic solution.

Figure 5:
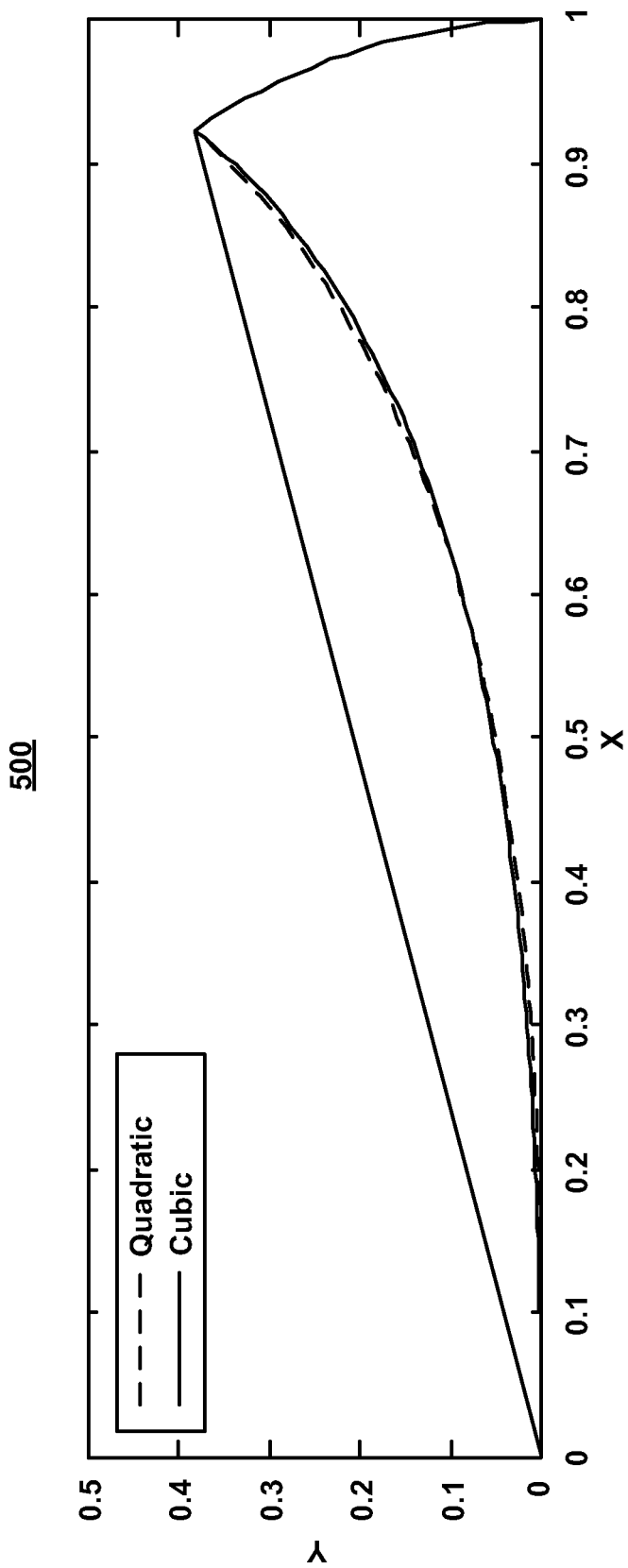
FIG. 5 illustrates the difference between cubic and quadratic sensor electrodes, according to an embodiment.

FIG. 5 shows a graph 500 that illustrates the difference between cubic and quadratic sensor electrodes, where the curved border for a quadratic electrode is illustrated with a dashed line and the curved border for a cubic electrode is illustrated with a solid line. Based on plots of the two electrode geometries, it is apparent that any theoretical improvement between the cubic and quadratic designs is negligible. Thus for ease of implementation the simpler quadratic design can be used with negligible difference in performance.

Figure 6:
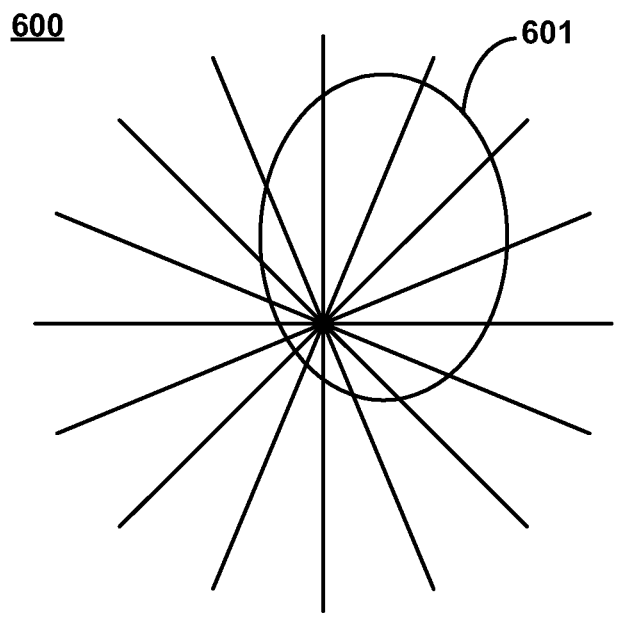
FIG. 6 illustrates the central region of a circular sensor pattern with an example contact region of a finger or other contacting object overlaid thereon, according to an embodiment.
Figure 7A:
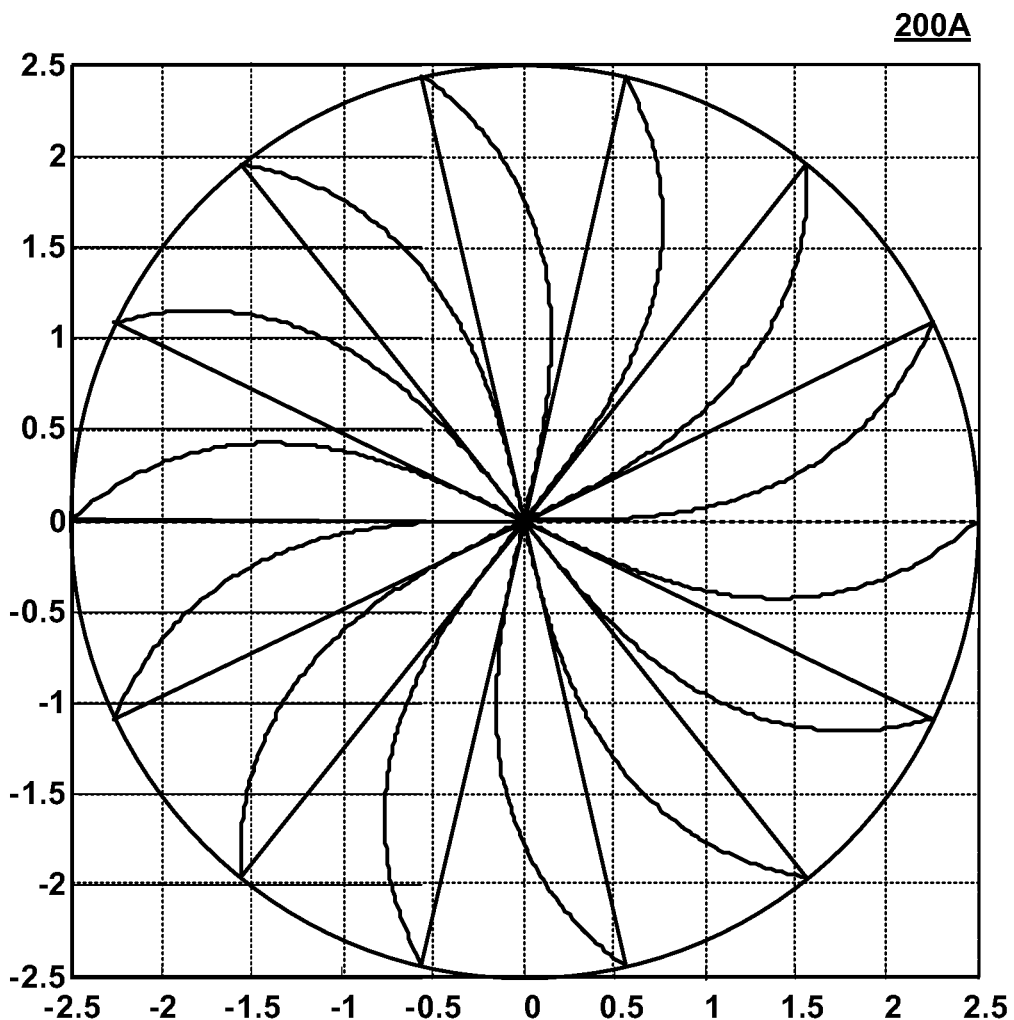
FIG. 7A illustrates a plan view of a large pinwheel sensor pattern and FIG. 7B illustrates a plan view of a smaller pinwheel sensor pattern, according to various embodiments.
Figure 7B:
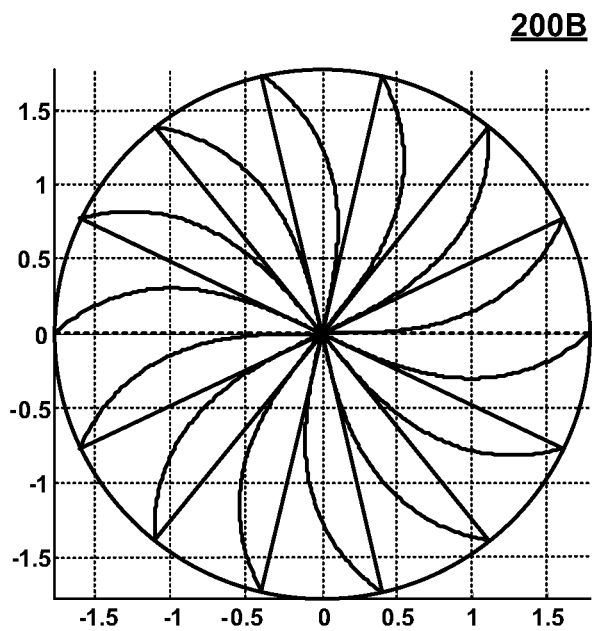

FIG. 6 illustrates the central region 600 of a sensor pattern containing only Q electrodes with a contact region 601 of a finger overlaid thereon. Attention is directed toward examination of the challenges of locating the finger position when it is in this central region. First, the P electrodes will, in practice, not exist because their width will have shrunk below some minimum width. The Q electrodes will be sectors as shown in FIG. 6. First, it can be recognized that the contact region 601 of the finger is in the central region when all the P electrode measurements are smaller than all the Q electrode measurements. When the finger is in the central region, only the Q electrode measurements are used to resolve (r,θ). The θ measurement is determined as before, by interpolating the Q electrode measurements values. The r measurement is determined based on the relative magnitude of the maximum Q measurements and the minimum Q measurements. For reference in conjunction with FIG. 6, FIG. 7A illustrates a large pinwheel sensor pattern 200A and FIG. 7B illustrates a smaller pinwheel sensor pattern 200B. As can be seen, in the central regions of the sensor patterns illustrated in FIG. 7A and in FIG. 7B, the area of the Q electrodes dominates even as the size of the patterns is altered from larger to smaller.

It is appreciated that reflections and rotations of sensor cell 201 can be arranged in single-layer circular capacitive sensor patterns to form similar sensor patterns to circular sensor pattern 200. As previously described, sensor pattern 300 represents an example of both rotation and rotation/reflection of sensor cell 201. Additionally, it is appreciated that, transformations that keep P(r) and Q(r) constant are effectively the same sensor electrode as sensor cell 201. A symmetrized version of the pinwheel sensor, called the daisy sensor, is illustrated in FIG. 3 and can be created in at least two ways, as has been described. In one described embodiment, where the sensor cells of sensor pattern 300 are transformations of sensor cell 201, the electrode boundaries of sensor cell 301 are given by g(r)=±f(r)/2, and its rotations. The radial inversion formula is the same as for the pinwheel sensor.

Example Method of Creating a Circular Sensor Pattern of a Two-Dimensional Capacitive Sensor Device With reference to elements of FIGS. 1-3 an example method of creating a circular sensor pattern of a two-dimensional capacitive sensor device, according to an embodiment. In one embodiment, the method is utilized to form a sensor cell and/or sensor pattern in sensing region 108 on substrate 102 of FIG. 1.

In one embodiment, the method forms a first sensor electrode of a first wedge shaped sensor cell on a sensor substrate. The first wedge shaped sensor comprises two substantially straight sides that diverge from a common point and are connected by a third, curved side. The first sensor electrode has a varying width defined by a curved boundary along a first radial direction, a minimum width at a first edge along the first radial direction, and a maximum width at a second edge along the first radial direction. In one embodiment, this comprises forming sensor electrode 203 on substrate 102. In one embodiment, the first direction comprises a radial direction radiating outward from the center of a circle.

In one embodiment, the method forms a second sensor electrode of the first sensor cell on the sensor substrate. The second sensor electrode has a varying width along the first radial direction and substantially identical minimum widths at the first edge and at the second edge. In one embodiment, this comprises forming sensor electrode 202 on substrate 102 when the first sensor electrode was sensor electrode 203. The first sensor electrode and second sensor electrode comprise substantially equal surface areas to one another to provide immunity to common mode noise.

In one embodiment, a plurality of rotated and/or rotated and reflected copies of the first sensor electrode are disposed in a circular arrangement where the vertexes of the wedges meet at a common point in the center of the circle. This arrangement of the plurality of wedges forms the circular capacitive sensor pattern. Enable first claim set Example Single-Layer Capacitive Sensor Cells for Circular Sensor Patterns with Some Piecewise Linear Internal Electrode Borders in the Sensor Cells As previously described, there are some advantages to forming cells that include electrodes with piecewise linear borders between electrodes. Ease of manufacturing, in some instances, is one advantage. All of the geometries described in FIGS. 8A through 14 illustrate single-layer circular sensor patterns comprised of sensor cells with internal piecewise linear borders. This allows for easier fabrication and allows coordinate computations to be performed with very simple formulas (compared to the fabrication/computations used for the curved edge sensor electrodes of sensor cells 201 and 301). At the same time, these internally piecewise linear bordered sensor electrode embodiments also share the same or similar high immunity to common mode and finger coupled noise as was described in accordance with sensor cell 201 and 301. As shown in FIGS. 8A-14 and described below, both bi-electrode and tri-electrode designs can also be implemented using the techniques described herein. It is also appreciated that a substantially piecewise linear representation of the curved edge sensor electrodes in sensor cells 201 and/or 301 can be implemented.

Figure 12:
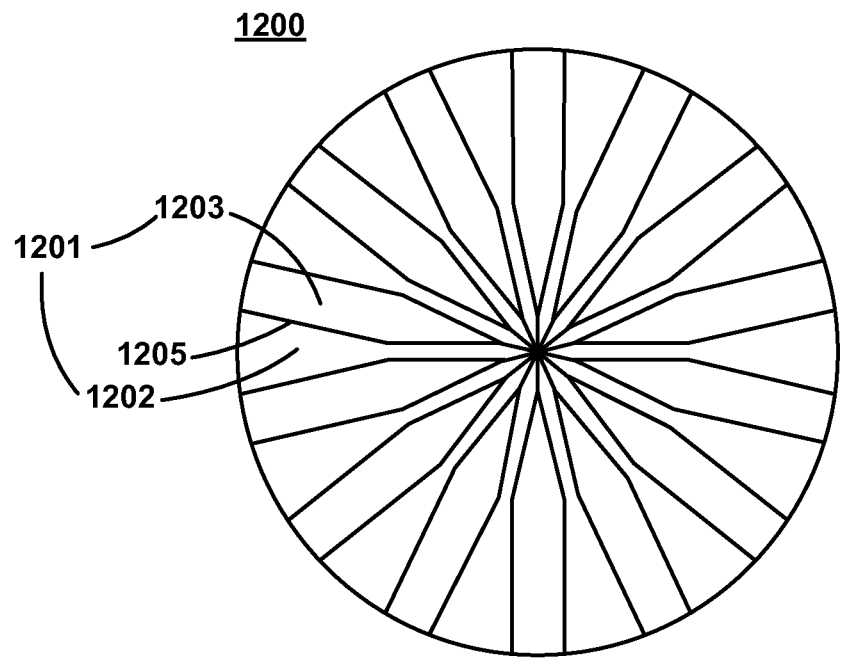
FIG. 12 illustrates a plan view of an example circular sensor pattern comprised of sensor cells with internal piecewise linear borders, according to an embodiment.
Figure 13:
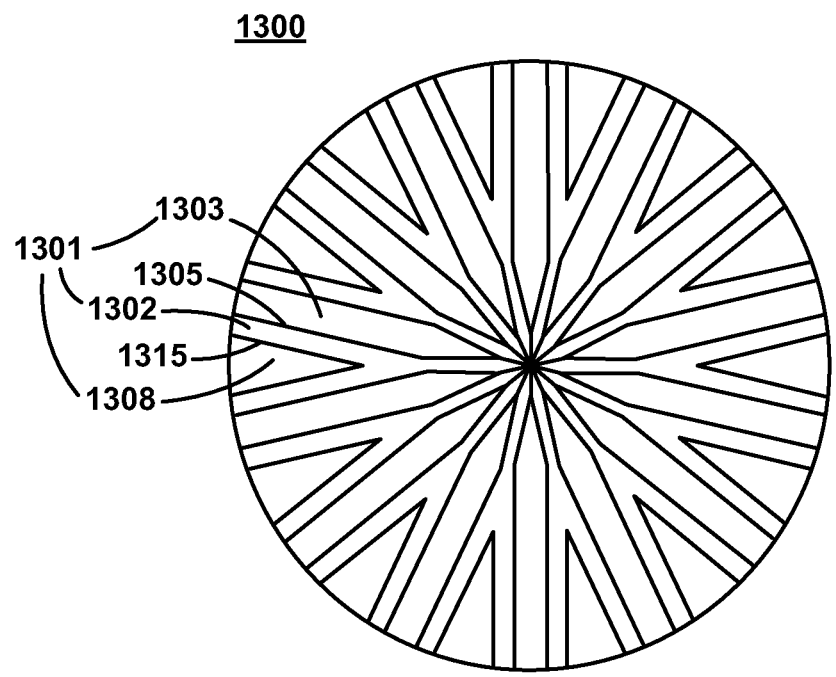
FIG. 13 illustrates a plan view of an example circular sensor pattern comprised of sensor cells with internal piecewise linear borders, according to an embodiment.
Figure 14:
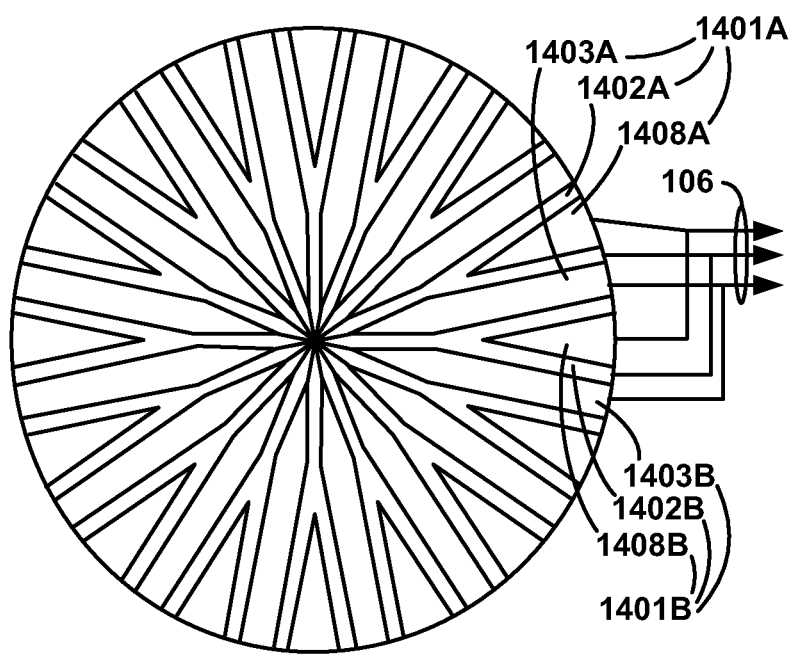
FIG. 14 illustrates a plan view of an example circular sensor pattern comprised of sensor cells with internal piecewise linear borders and example of connecting conductive traces to the sensor electrodes thereof, according to an embodiment.

Additionally, it is understood that sensor electrodes of the sensor cells in FIGS. 2-13 can individually be coupled with sensing circuitry (e.g., sensing circuitry 110 of FIG. 1) utilizing conductive coupling traces (e.g., coupling traces 106), or can be coupled in a decimated fashion as illustrated an FIG. 14.

The geometries illustrated in FIGS. 8A-14 are composed of electrodes disposed in a single-layer, and all the electrodes have polygonal shapes (except along the circular edge of the sensor cell), so they are easier to design, implement and fabricate. The surface of each illustrated sensor pattern in FIGS. 8A-14 is divided in a number of wedge shaped sensor cells, each having the same size and shape. Every sensor cell has a number of electrodes (usually two or three) with specific shapes, as seen in FIGS. 9-14.

Due to the circular shape of the sensor patterns illustrated in FIGS. 8A-14, when making location measurements of a contacting object, the polar coordinates (R,θ) are extracted and then, in some embodiments, converted to Cartesian form. While the θ coordinate computation (perpendicular to the electrodes) is a simple interpolation problem, the R-coordinate (along the electrodes) will be computed from the relative widths of the electrodes in the touch area of the contacting object (e.g., a finger), using simple formulas.

Some of the illustrated sensor geometries (the three electrode per cell ones shown in FIGS. 9A, 9B, 10A, 10B, 11A, 11B, and 13 and the two electrode per cell ones shown in FIGS. 8A, 8B, and 12) achieve a high noise immunity (common-mode and finger-coupled noise). This comes from the fact that all sensor electrodes may have substantially the same area, so in the presence of common-mode noise, each signal will be affected by the same quantity. When all sensor electrodes do not have the same area, combinations of sensor electrodes may have the same area. For example, one sensor electrode may have substantially 50% of the surface area while two other sensor electrodes each have substantially 25% of the surface area (for a total of 50%). That is, if the signals that are read from three adjacent sensor electrodes are P,Q,S, then in the presence of noise, the sensing circuitry will read:

$$P+\epsilon, Q+\epsilon, S+\epsilon \qquad \text{Equation 11}$$

By replacing Equation 11 in equations derived for polar coordinates calculation, exactly the same formulas are obtained, which means that the R coordinate is not affected by the common-mode noise.

Figure 9A:
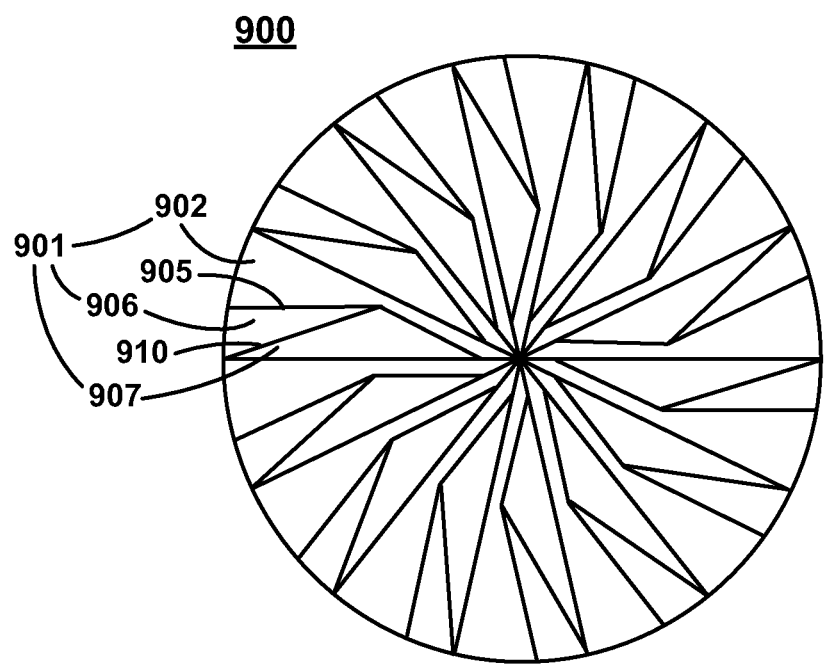
FIGS. 9A and 9B illustrate plan views of two example single-layer circular sensor patterns comprised of sensor cells with internal piecewise linear borders, according to various embodiments.
Figure 9B:
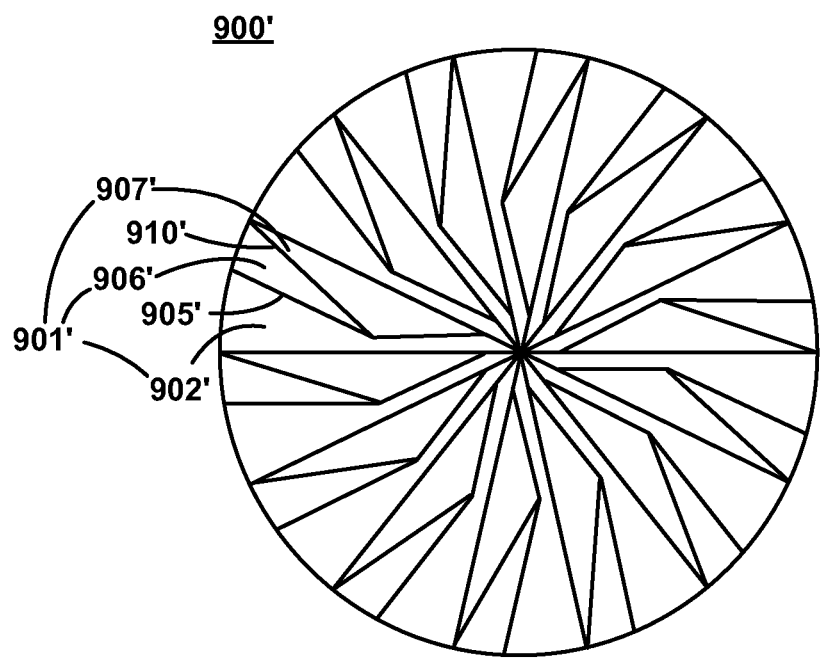
Figure 10A:
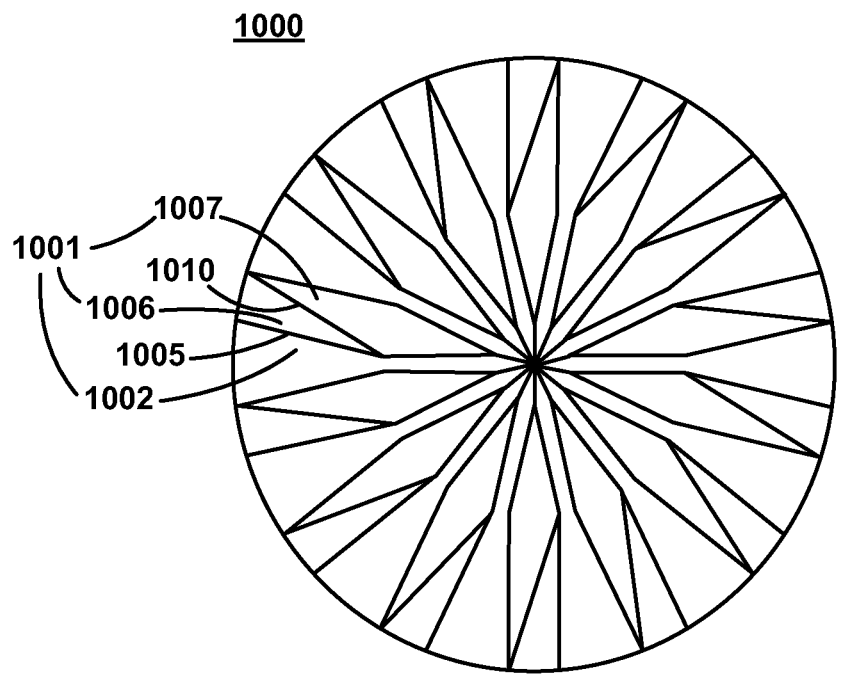
FIGS. 10A and 10B illustrate plan views of two example single-layer circular sensor patterns comprised of sensor cells with internal piecewise linear borders, according to various embodiments.
Figure 10B:
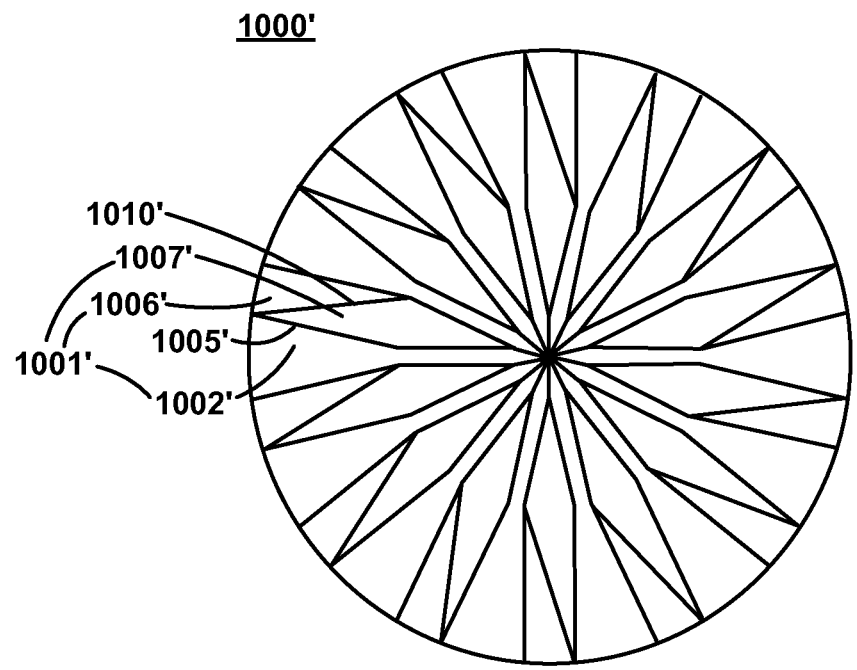
Figure 11A:
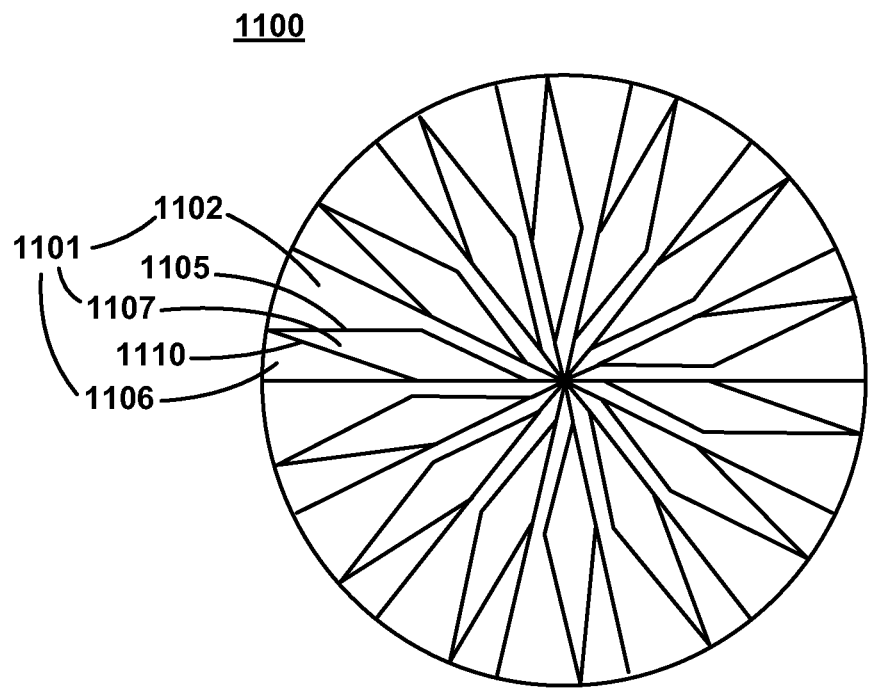
FIGS. 11A and 11B illustrate plan views of two example single-layer circular sensor patterns comprised of sensor cells with internal piecewise linear borders, according to various embodiments.
Figure 11B:
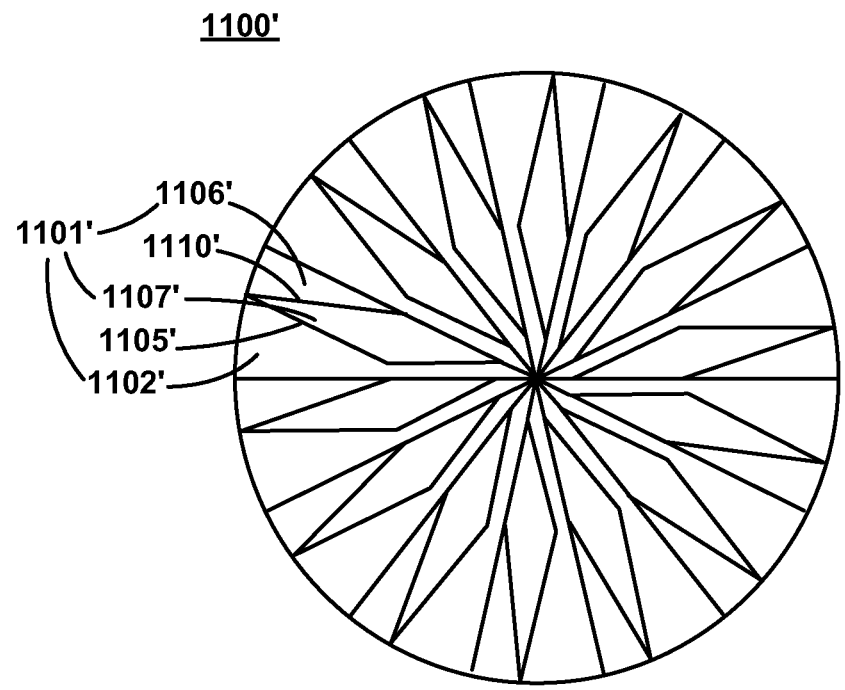

The geometries illustrated in FIGS. 8A-11B are composed of a number of identical sensor cells, each sensor cell containing a number of two or three sensor electrodes. Each sensor electrode is, of course, connected to a sensing channel (in decimated arrangements, a plurality of similar electrodes in adjacent sensor cells may be coupled to the same channel, as illustrated in FIG. 14). For every geometry illustrated in FIGS. 8A-14, the shape of the sensor electrodes inside a sensor cell is different from the shapes of the sensor electrodes shown in any of the other geometries. It is appreciated, however, that some geometries comprise reflected arrangements of other geometries. For example FIG. 8B shows a sensor cells with a reflected geometry to those of FIG. 8A; FIG. 9A shows a sensor cells with a reflected geometry to those of FIG. 9A; FIG. 10B shows a sensor cells with a reflected geometry to those of FIG. 10A; and FIG. 11B shows a sensor cells with a reflected geometry to those of FIG. 11A.

In FIGS. 8A-14, it is appreciated that the dimensions for each sensor electrode inside a sensor cell follow a number of design rules, which may include: 1) all the sensor electrodes inside a sensor cell are symmetrical relative to the center of the circular sensor pattern; 2) the ratio of the sensor electrodes' width inside a sensor cell and along the radius of the circular sensor pattern is always variable; 3) the ratio of the sensor electrodes' width inside a sensor cell and for a constant distance from the circular sensor pattern's center is always constant, and 4) all the sensor electrodes inside a sensor cell have substantially equal surface area.

As previously described with respect to FIGS. 2 and 3, a special case exists when the contact of a contacting object (e.g., a finger) is very close to the center of the circular sensor pattern. In one such embodiment, the position of the contacting object relative to the sensor pattern is determined using all the values provided by only those electrodes that reach completely to the center of the single-layer circular sensor patterns in order to get a good estimation of the position.

Figure 8A:
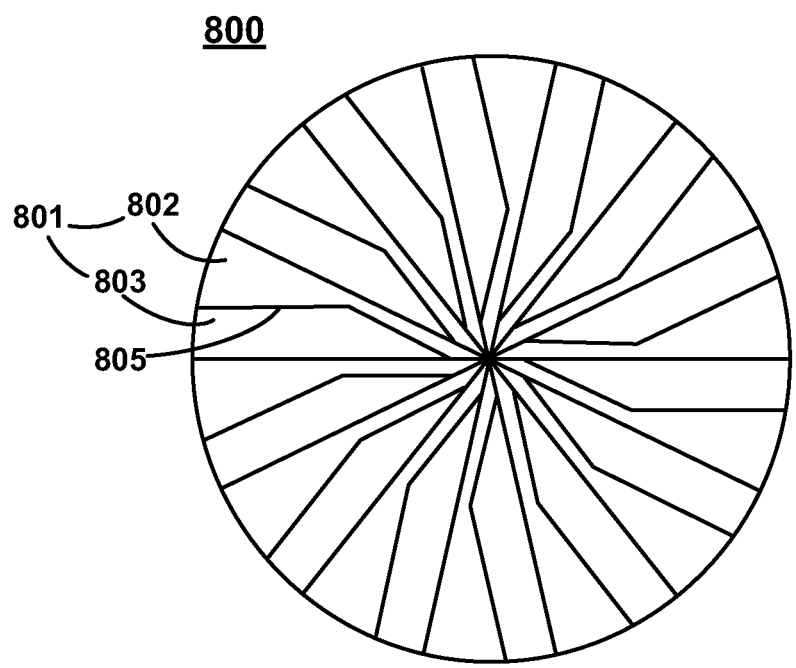
FIGS. 8A and 8B illustrate plan views of two example single-layer circular sensor patterns comprised of sensor cells with internal piecewise linear borders, according to various embodiments.
Figure 8B:
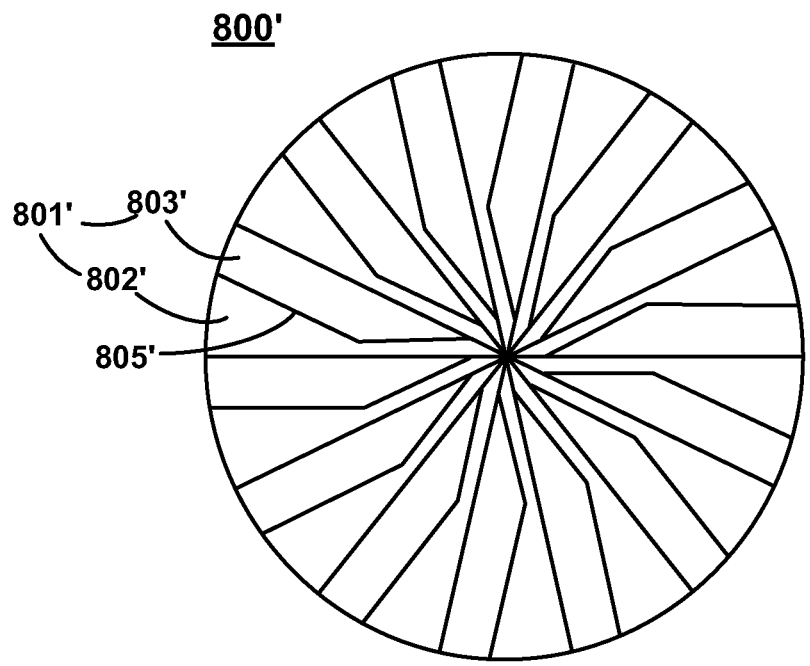

FIGS. 8A and 8B illustrate plan views of two example single-layer circular sensor patterns 800 and 800' comprised of sensor cells with piecewise linear borders, according to various embodiments. In FIG. 8A, a single-layer circular sensor pattern 800 comprises a plurality of sensor cells, N. Sensor cell 801 illustrates one of these sensor cells. The other N−1 sensor electrodes in single-layer circular sensor pattern 800 are rotated copies of sensor cell 801. Sensor cell 801 is composed of two sensor electrodes 802 and 803 that are separated by a piecewise linear border 805.

In FIG. 8B, single-layer circular sensor pattern 800' comprises a plurality of sensor cells, N. Sensor cell 801' is a reflected version of sensor cell 801 and illustrates one of these sensor cells. The other N−1 sensor electrodes in single-layer circular sensor pattern 800' are rotated copies of sensor cell 801'. Sensor cell 801' is composed of two sensor electrodes 802' and 803' that are separated by a piecewise linear border 805'.

FIGS. 9A and 9B illustrate plan views of two example single-layer circular sensor patterns 900 and 900' comprised of sensor cells with piecewise linear borders, according to various embodiments. In FIG. 9A, single-layer circular sensor pattern 900 comprises a plurality of sensor cells, N. Sensor cell 901 illustrates one of these sensor cells. The other N−1 sensor electrodes in single-layer circular sensor pattern 900 are rotated copies of sensor cell 901. Sensor cell 901 is composed of three sensor electrodes 902, 906, and 907. Sensor electrode 902 is substantially the same as sensor electrode 802 of FIG. 8A, and is separated from sensor electrodes 906 and 907 by piecewise linear border 905. Sensor electrodes 906 and 907 are separated by a piecewise linear border 910.

In FIG. 9B, single-layer circular sensor pattern 900' comprises a plurality of sensor cells, N. Sensor cell 901' illustrates one of these sensor cells. Sensor cell 901' is a reflected version of sensor cell 901 and illustrates one of these sensor cells. The other N−1 sensor electrodes in single-layer circular sensor pattern 900' are rotated copies of sensor cell 901' of FIG. 9A. Sensor cell 901' is composed of three sensor electrodes 902', 906', and 907'. Sensor electrode 902' is substantially the same as sensor electrode 802' of FIG. 8B, and is separated from sensor electrodes 906' and 907' by piecewise linear border 905'. Sensor electrodes 906 and 907 are separated by a piecewise linear border 910'.

FIGS. 10A and 10B illustrate plan views of two example single-layer circular sensor patterns 1000A and 1000B comprised of sensor cells with internal piecewise linear borders, according to various embodiments. In FIG. 10A, single-layer circular sensor pattern 1000 comprises a plurality of sensor cells, N. Sensor cell 1001 illustrates one of these sensor cells. The other N−1 sensor electrodes in single-layer circular sensor pattern 1000 are rotated copies of sensor cell 1001. Sensor cell 1001 is composed of three sensor electrodes 1002, 1006, and 1007. Sensor electrode 1002 is separated from sensor electrodes 1006 and 1007 by piecewise linear border 1005. Sensor electrodes 1006 and 1007 are separated by a piecewise linear border 1010.

In FIG. 10B, single-layer circular sensor pattern 1000' comprises a plurality of sensor cells, N. Sensor cell 1001' illustrates one of these sensor cells. Sensor cell 1001' is a reflected version of sensor cell 1001 and illustrates one of these sensor cells. The other N−1 sensor electrodes in single-layer circular sensor pattern 1000' are rotated copies of sensor cell 1001 of FIG. 10A. Sensor cell 1001' is composed of three sensor electrodes 1002', 1006', and 1007'. Sensor electrode 1002' is separated from sensor electrodes 1006' and 1007' by piecewise linear border 1005'. Sensor electrodes 1006' and 1007' are separated by a piecewise linear border 1010'.

FIGS. 11A and 11B illustrate plan views of two example single-layer circular sensor patterns 1100 and 1100' comprised of sensor cells with internal piecewise linear borders, according to various embodiments. In FIG. 11A, single-layer circular sensor pattern 1100 comprises a plurality of sensor cells, N. Sensor cell 1101 illustrates one of these sensor cells. The other N−1 sensor electrodes in single-layer circular sensor pattern 1100 are rotated copies of sensor cell 1101. Sensor cell 1101 is composed of three sensor electrodes 1102, 1106, and 1107. Sensor electrode 1102 is separated from sensor electrodes 1106 and 1107 by piecewise linear border 1105. Sensor electrodes 1106 and 1107 are separated by a piecewise linear border 1110.

In FIG. 11B, single-layer circular sensor pattern 1100' comprises a plurality of sensor cells, N. Sensor cell 1101' illustrates one of these sensor cells. Sensor cell 1101' is a reflected version of sensor cell 1101 and illustrates one of these sensor cells. The other N−1 sensor electrodes in single-layer circular sensor pattern 1100' are rotated copies of sensor cell 1101 of FIG. 10A. Sensor cell 1101' is composed of three sensor electrodes 1102', 1106', and 1107'. Sensor electrode 1102' is separated from sensor electrodes 1106' and 1107' by piecewise linear border 1105'. Sensor electrodes 1106' and 1107' are separated by a piecewise linear border 1110'.

FIG. 12 illustrates a plan view of an example circular sensor pattern 1200 comprised of sensor cells with internal piecewise linear borders, according to an embodiment. In FIG. 12, single-layer circular sensor pattern 1200 comprises a plurality of sensor cells, N. Sensor cell 1201 illustrates one of these sensor cells. The other N−1 sensor electrodes in single-layer circular sensor pattern 1200 are rotated copies of sensor cell 1201. Sensor cell 1201 is composed of two sensor electrodes 1202 and 1203 that are separated by a piecewise linear border 1205.

FIG. 13 illustrates a plan view of an example circular sensor pattern 1300 comprised of sensor cells with internal piecewise linear borders, according to an embodiment. In FIG. 13, single-layer circular sensor pattern 1300 comprises a plurality of sensor cells, N. Sensor cell 1301 illustrates one of these sensor cells. The other N−1 sensor electrodes in single-layer circular sensor pattern 1300 are rotated copies of sensor cell 1301. Sensor cell 1301 is composed of three sensor electrodes 1302, 1303, and 1108. Sensor electrode 1302 is separated from sensor electrode 1303 by piecewise linear border 1305. Sensor electrode 1305 is separated from sensor electrode 1308 by piecewise linear border 1315.

FIG. 14 illustrates a plan view of an example circular sensor pattern 1400 comprised of sensor cells with internal piecewise linear borders and example of connecting conductive traces to the sensor electrodes thereof, according to an embodiment. It is appreciated that sensor cells, and sensor electrodes thereof, in circular sensor pattern 1400 are substantially the same in shape, surface area, and layout to those of circular sensor pattern 1300 of FIG. 13. In FIG. 14, two sensor cells 1401A and 1401B are illustrated. Sensor cell 1401A is composed of sensor electrodes 1402A, 1403A, and 1408A. Sensor cell 1401B is composed of sensor electrodes 1402B, 1403B, and 1408B.

In FIGS. 8A-14 (as well as in FIGS. 2 and 3) all the connections between sensor electrodes and the sensing circuitry (e.g., sensing circuitry 110) can be made with conductive traces (e.g., conductive traces 106) along a circular sensor pattern's edge, as has been illustrated by the edge connections in FIG. 14. This minimizes and simplifies the wiring/routing. Decimation, while not required, will improve the precision of the response, in some embodiments. Decimation means replacing a cell (group of two or more adjacent sensor electrodes) with at least a doubly sized group of adjacent sensor electrodes by electrically connecting together those sensor electrodes with the same shape in neighboring sensor cells. FIG. 14 shows an example of a decimated connection of two adjacent sensor cells 1401A and 1401B. While all of the sensor cells of a pattern are disposed in a single layer, in some embodiments, the conductive traces may be disposed in multiple layers.

As can be seen from FIGS. 2, 3, and 8A-14, the described embodiments comprise circular sensor patterns that are composed of a plurality of wedge shaped sensor cells arranged in a single-layer circular pattern, on or proximal to a surface of a substrate such as substrate 102. By wedge shaped what is meant is that the sensor cells are very narrow at the center of the circular pattern and substantially wider on the circumferential edge of the circular pattern. The illustrated embodiments are comprised of sensor cells arranged in a rotationally symmetric pattern about a center of each respective single-layer circular pattern. Any sensor cell of the plurality of sensor cells in a particular circular pattern comprises at least first sensor electrode and a second sensor electrode that separated by a border. The border may be curved or piecewise linear in nature.

The sensor electrodes of a sensor cell and of the single layer pattern, as a whole, are configured for detecting changes in capacitance caused by one or more input objects proximal to the circular single layer pattern. Only those sensor electrodes in the single-layer circular pattern are needed to detect the capacitance changes (i.e. no sensor electrodes in other layers are used or needed). As is illustrated, all of the sensor electrodes in a sensor cell of a single-layer circular pattern become substantially thinner in width as they approach the center of their respective single-layer circular pattern. This thinness is relative in nature meaning that there are wider portions of the sensor electrodes at a further distance away from the center. It is appreciated, however, that in some embodiments a sensor electrode may get slightly wider when approaching the center without negating the fact that it narrows substantially when approaching the center. In a capacitive sensor device, sensor circuitry, such as sensor circuitry 110, is communicatively coupled with the sensor electrodes of the sensor cells in a single-layer circular pattern and is configured to interpret the changes in capacitance.

As is illustrated in FIGS. 2, 3, and 8A-14, a width ratio of sensor electrodes within any sensor cell of embodiments of single-layer circular patterns varies in a radial direction relative to the center of the single-layer circular pattern. As is also illustrated in FIGS. 2, 3, and 8A-14 a width ratio of sensor electrodes within one sensor cell of a particular single-layer circular pattern is substantially equal to another sensor cell within the same single-layer circular pattern at a constant radial distance relative to the center of the single-layer circular pattern.

Example Method of Creating a Circular Sensor Pattern of a Two-Dimensional Capacitive Sensor Pattern with a Plurality of Wedge Shaped Sensor Cells FIG. 15 is a flow diagram 1500 of an example method of creating a circular sensor pattern of a two-dimensional capacitive sensor pattern with a plurality of wedge shaped sensor cells, N, according to an embodiment. Although reference is made to FIG. 1 and FIG. 8 in describing the procedures of flow diagram 1500, this is by way of example and not of limitation. Thus, it is appreciated that procedures of flow diagram 1500 are applicable to one or more of the single-layer circular sensor patterns and/or devices described herein, or their equivalents.

At 1510, in one embodiment, a first wedge shaped sensor cell is formed proximal to a sensor substrate such as sensor substrate 102. By proximal, what is meant is formation upon the surface or upon a layer that is on the surface or upon a layer that is separated from the surface by one or more layers. The first wedge shaped sensor cell comprises at least a first sensor electrode and a second sensor electrode of different shapes that are separated by a shared electrode border, but may comprise three or more sensor electrodes. The shared electrode border may be curved or a piecewise linear border. The first sensor electrode has a different shape than the second sensor electrode. If there are more than two sensor electrodes formed in a sensor cell all of the sensor electrodes of the sensor cell have different shapes from one another. In some embodiments, each sensor electrode formed in a sensor cell has substantially the same surface area of any other sensor electrode in the sensor cell. In some embodiments, sensor electrodes of the first wedge shaped sensor cell are formed such that a width ratio of the sensor electrodes within the first wedge shaped sensor cell varies in a radial direction relative to the center of the single-layer circular pattern. Sensor cells 201 and 801 are two examples of sensor cells that may be formed, and that illustrate many or all of these features. The process of forming may comprise, among other techniques, sputtering a layer of ITO (Indium tin oxide) and then etching the sputtered layer to form the sensor cell and the sensor electrodes of the sensor cell. Other materials and application techniques, as are known in the art, may be used as well.

At 1520, in one embodiment, an additional N−1 wedge shaped sensor cells are formed proximal to sensor substrate such that the first wedge shaped sensor cell and the additional N−1 wedge shaped sensor cells are arranged to form a single-layer circular pattern in which each of the N−1 wedge shaped sensor cells comprises a rotation or a reflected rotation of the first wedge shaped sensor cell. Sensor patterns 200 and 800 illustrate patterns where the sensor cells are rotated copies of one another. Sensor pattern 300 shows two sensor cells 201 and 201'. Sensor cell 201' is a rotated reflected copy of sensor cell 201. It is appreciated that the N−1 sensor cells are formed in the same single layer as the first sensor cell and thus may be formed concurrently with the formation of the first sensor cell. All of the N wedge shaped sensor cells are formed such that a width ratio of sensor electrodes within each of the wedge shaped sensor cells of the formed single-layer circular pattern is substantially equal at a constant radial distance relative to the center of the single-layer circular pattern.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. A two-dimensional capacitive sensor device comprising:
   a sensor substrate;
   a plurality of wedge shaped sensor cells arranged in a single-layer circular pattern proximal to said substrate, said plurality of wedge shaped sensor cells arranged in a rotationally symmetric pattern about a center of said single-layer circular pattern,
   wherein a sensor cell of said plurality of wedge shaped sensor cells comprises a first sensor electrode and a second sensor electrode separated by a border, said first and second sensor electrodes configured for detecting changes in capacitance caused by one or more input objects, and said first and second sensor electrodes becoming substantially thinner in width approaching said center of said single-layer circular pattern than at a distance further from said center; and
   sensor circuitry communicatively coupled with said sensor electrodes of said sensor cell of said plurality of wedge shaped sensor cells and configured to interpret said changes in capacitance.

2. The two-dimensional capacitive sensor device of claim 1, wherein sensor cells of said plurality of wedge shaped sensor cells comprise at least three sensor electrodes per sensor cell.

3. The two-dimensional capacitive sensor device of claim 1, wherein all sensor electrodes of said single-layer circular pattern are of substantially the same surface area.

4. The two-dimensional capacitive sensor device of claim 1, wherein a width ratio of sensor electrodes within said sensor cell varies in a radial direction relative to said center of said single-layer circular pattern.

5. The two-dimensional capacitive sensor device of claim 1, wherein a width ratio of sensor electrodes within said sensor cell is substantially equal to another sensor cell within said plurality of wedge shaped sensor cells at a constant radial distance relative to said center of said single-layer circular pattern.

6. The two-dimensional capacitive sensor device of claim 1, wherein all other sensor cells of said plurality of wedge shaped sensor cells are either rotations or rotated reflections of said sensor cell.

7. The two-dimensional capacitive sensor device of claim 1, wherein connections between said sensing circuitry and said sensor electrodes of said sensor cell of said plurality of wedge shaped sensor cells are disposed around a circumferential edge of said single-layer circular pattern.

8. A two-dimensional capacitive sensor pattern comprising:
   a sensor substrate; and
   a plurality of wedge shaped sensor cells arranged in a single-layer circular pattern proximal to said substrate, said plurality of wedge shaped sensor cells arranged in a rotationally symmetric pattern about a center of said single-layer circular pattern, and
   wherein a sensor cell of said plurality of wedge shaped sensor cells comprises at least a first sensor electrode and a second sensor electrode of different shapes that are separated by a shared piecewise linear electrode border, said first and second sensor electrodes configured for detecting changes in capacitance caused by one or more input objects.

9. The two-dimensional capacitive sensor pattern of claim 8, wherein sensor cells of said plurality of wedge shaped sensor cells comprise at least three sensor electrodes per sensor cell.

10. The two-dimensional capacitive sensor pattern of claim 8, wherein all sensor electrodes of said single-layer circular become substantially thinner in width approaching said center of said single-layer circular pattern than at a distance further from said center.

11. The two-dimensional capacitive sensor pattern of claim 8, wherein all sensor electrodes of said single-layer circular pattern are of substantially the same surface area.

12. The two-dimensional capacitive sensor pattern of claim 8, wherein a width ratio of sensor electrodes within said sensor cell varies in a radial direction relative to the center of said single-layer circular pattern.

13. The two-dimensional capacitive sensor pattern of claim 8, wherein a width ratio of sensor electrodes within said sensor cell is substantially equal to another sensor cell within said plurality of wedge shaped sensor cells at a constant radial distance relative to the center of said single-layer circular pattern.

14. The two-dimensional capacitive sensor pattern of claim 8, wherein all other sensor cells of said plurality of wedge shaped sensor cells are either rotations or rotated reflections of said sensor cell.

15. The two-dimensional capacitive sensor pattern of claim 8, wherein connections between sensing circuitry and sensor electrodes of said plurality of wedge shaped sensor cells are disposed around a circumferential edge of said single-layer circular pattern.

16. A method of creating a circular sensor pattern of a two-dimensional capacitive sensor pattern with a plurality of wedge shaped sensor cells, said method comprising:
   forming a first wedge shaped sensor cell proximal to a sensor substrate, said first wedge shaped sensor cell comprising at least a first sensor electrode and a second sensor electrode of different shapes separated by a shared piecewise linear electrode border, said first sensor electrode having a different shape than said second sensor electrode; and
   forming an additional N−1 wedge shaped sensor cells proximal to said sensor substrate such that said first wedge shaped sensor cell and said additional N−1 wedge shaped sensor cells are arranged to form a single-layer circular pattern, wherein each of said N−1 wedge shaped sensor cells comprises a rotation or reflected rotation of said first wedge shaped sensor cell.

17. The method as recited in claim 16, wherein said forming a first wedge shaped sensor cell proximal to a sensor substrate comprises:
   forming said first wedge shaped sensor cell with at least three sensor electrodes.

18. The method as recited in claim 16, wherein said forming a first wedge shaped sensor cell proximal to a sensor substrate comprises:
   forming sensor electrodes of said first wedge shaped sensor cell to be of substantially the same surface area.

19. The method as recited in claim 16, wherein said forming a first wedge shaped sensor cell proximal to a sensor substrate comprises:
   forming sensor electrodes of said first wedge shaped sensor cell such that a width ratio of said sensor electrodes within said first wedge shaped sensor cell varies in a radial direction relative to the center of said single-layer circular pattern.

20. The method as recited in claim 16, wherein said forming an additional N−1 wedge shaped sensor cells proximal to said sensor substrate such that said first wedge shaped sensor cell and said additional N−1 wedge shaped sensor cells are arranged to form a single-layer circular pattern comprises:
   forming said N wedge shaped sensor cells such that a width ratio of sensor electrodes within each of said wedge shaped sensor cells is substantially equal at a constant radial distance relative to the center of said single-layer circular pattern.

\* \* \* \* \*